May 19, 1953        A. T. SCHEIWER        2,638,916
FUELING DEVICE

Filed March 29, 1947                        3 Sheets-Sheet 1

INVENTOR.
Albert T. Scheiwer

INVENTOR.
Albert T. Scheiwer

May 19, 1953 A. T. SCHEIWER 2,638,916
FUELING DEVICE

Filed March 29, 1947 3 Sheets-Sheet 3

INVENTOR.
Albert T. Scheiwer

Patented May 19, 1953

2,638,916

UNITED STATES PATENT OFFICE 2,638,916

FUELING DEVICE

Albert T. Scheiwer, Erie, Pa.

Application March 29, 1947, Serial No. 738,042

4 Claims. (Cl. 137—235)

This invention relates generally to a fueling device, and it relates more particularly to an airplane fueling device which does not lose fuel after the fuel supply line is disconnected.

All airplane fueling devices of which I have knowledge have been such that the fuel would be placed in the tank from an aperture on the top side of the tank. Attempts have been made to fuel a plane from the bottom of the tank but it has been found that so much fuel was lost that it was practically impossible to get fuel in the tank without losing a considerable portion thereof.

It is, accordingly, an object of my invention to provide a novel fuel tank filling device operable from the bottom side of the tank, and it is more particularly an object of my invention to provide fuel tank filling means which is simple in construction, economical in cost, efficient in operation, and easy to install.

Another object of my invention is to provide a means for filling the fuel tank of an airplane from the bottom side thereof without losing any of the fuel when the coupling is disconnected.

Another object of my invention is to provide a novel means in a fuel tank of an airplane to automatically close the fuel line leading to the tank.

Another object of my invention is to provide a fuel line entering the tank of an airplane around which no fuel remains when fuel ceases to pass through the fuel line.

Figure 1:
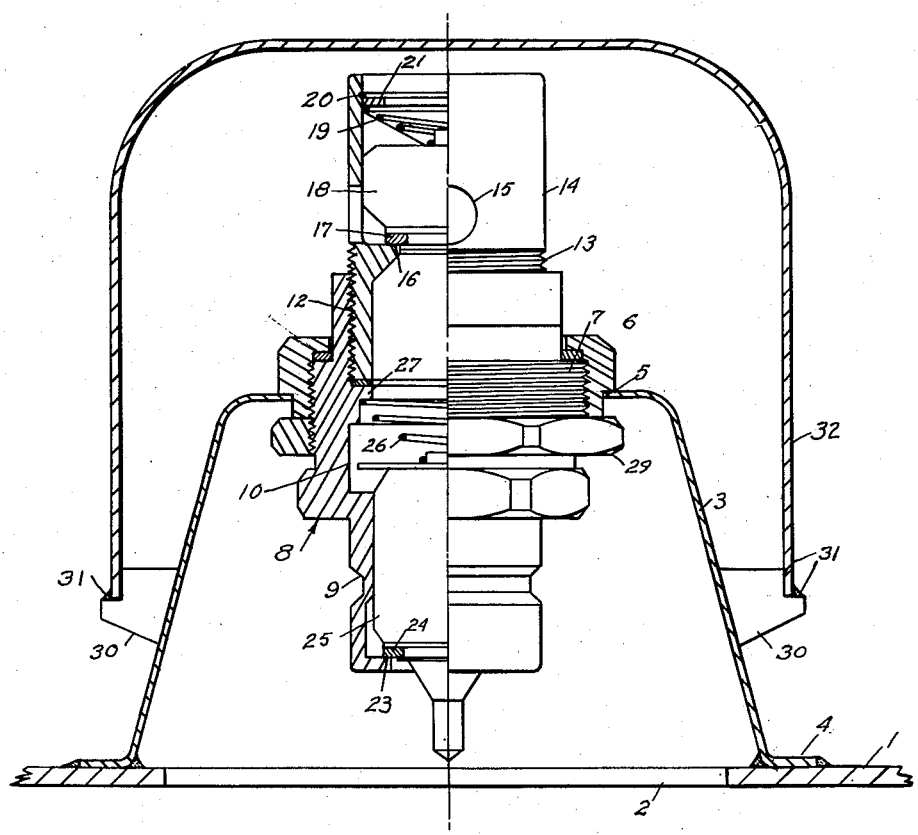

Other objects of my invention will become evident from the following detailed description, taken in conjunction with the accompanying drawings, in which Fig. 1 is a side elevational view partly in section showing an illustration of one embodiment of my invention disposed in the bottom of a fuel tank.

Figure 2:
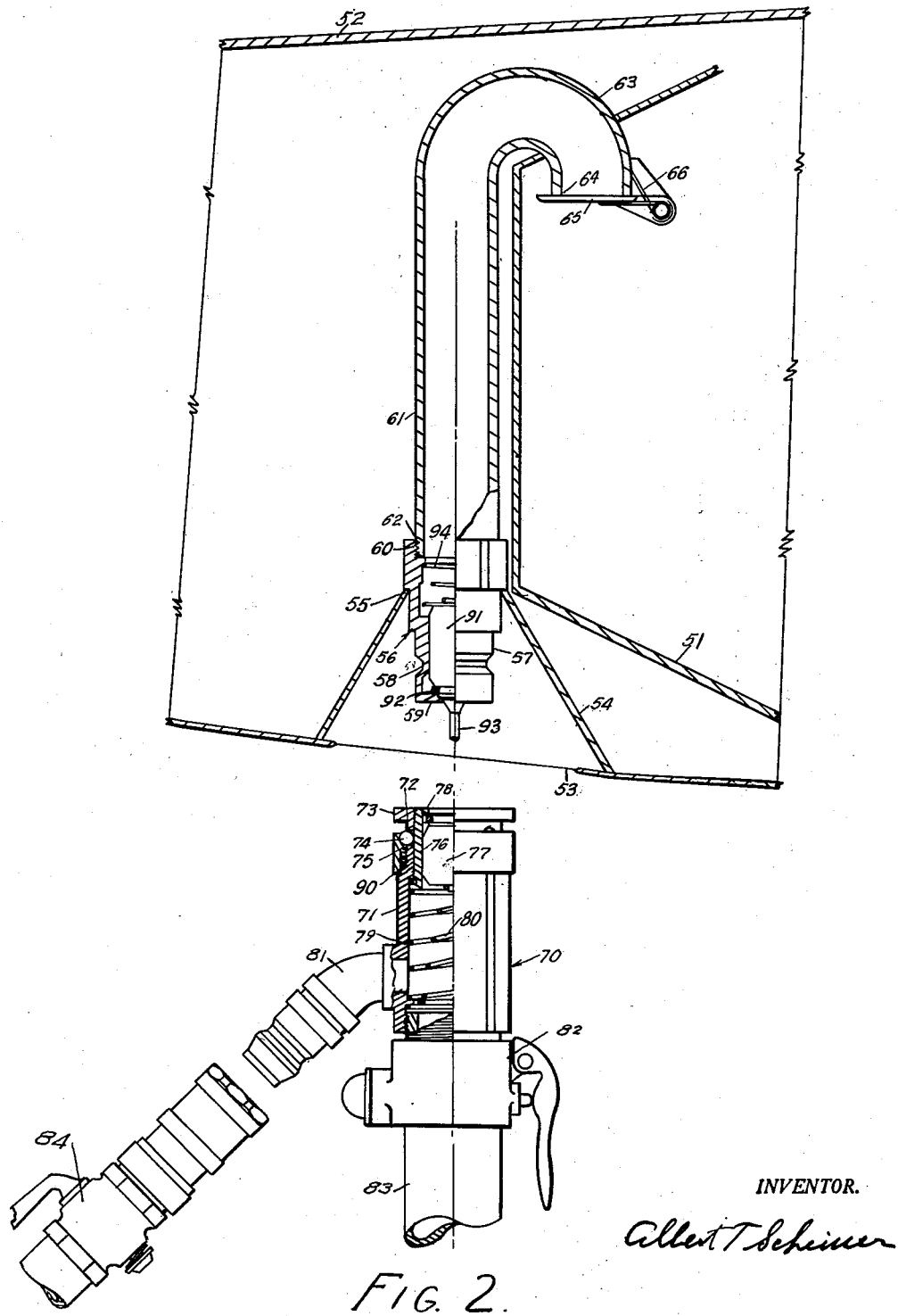
Figure 3:
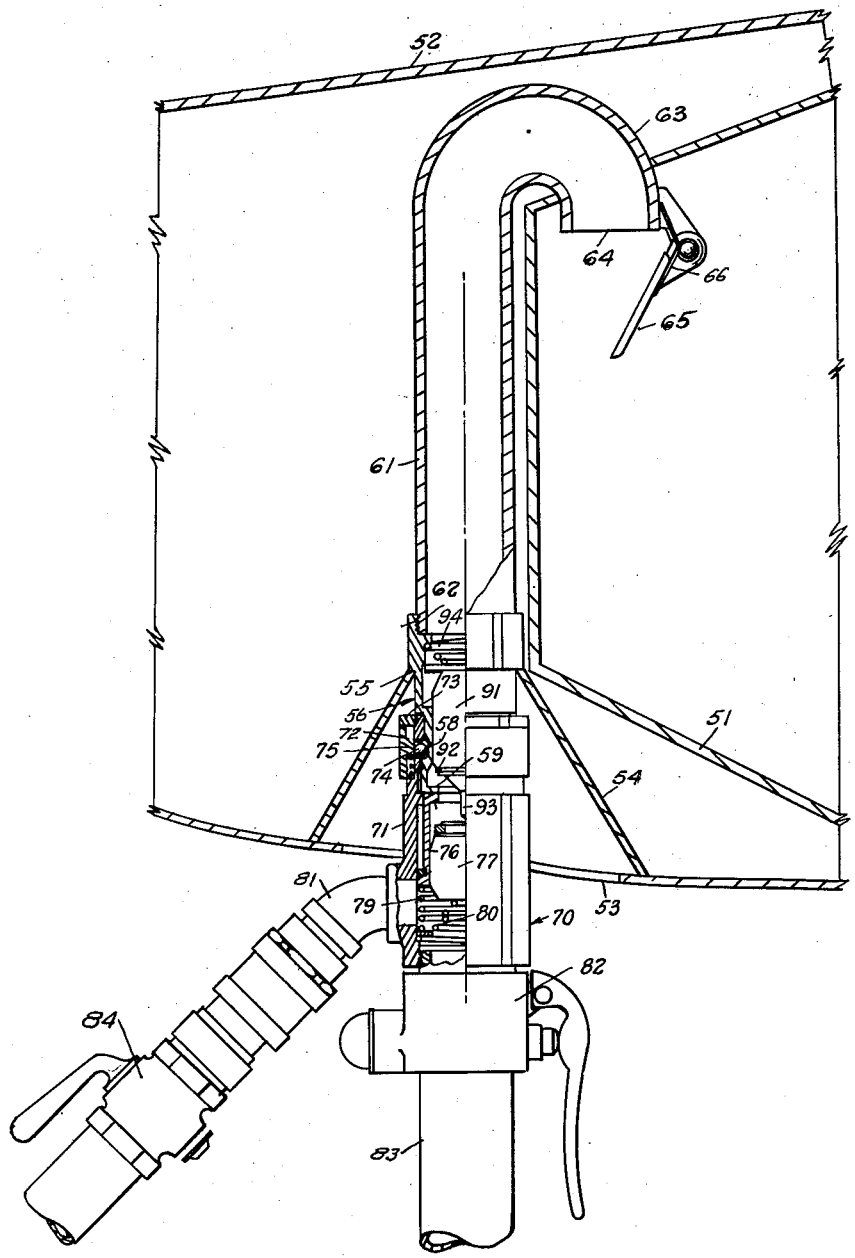

Fig. 2 is an exploded view of another novel means for filling the tank of an airplane; and Fig. 3 is a vertical sectional view with parts broken away for better illustration showing my novel means for fueling the tank of an airplane along with the fuel supply coupling attached thereto.

Referring now to the drawings, Fig. 1 shows the bottom of a fuel tank 1 having an aperture 2 over which is disposed a tapered inverted cup-shaped member 3 having the lower flanged marginal portion 4 welded to the bottom of the fuel tank 1. The cup-shaped member 3 has a centrally disposed aperture 5 for receiving a threaded flanged collar 6 in threadable engagement with the threaded portion 7 of a male coupling member 8 having an outer peripheral groove 9 and an inner annular groove 10. The male member 8 also has an inner threaded portion 12 for receiving the threaded end 13 of a connecting member 14 having laterally extending apertures 15 for the passage of fuel. The member 14 has an internal annular seating portion 16 for seating a washer 17 of a check valve 18 movable in the member 14. The washer 17 is urged against the seating portion 16 of the member 14 by spring member 19 which is held in the member 14 by a spring clip 20 and a stop member 21. The male member 8 has an inner flanged seating portion 23 for engaging a washer 24 on the end of a check valve 25 movable in the male member 8, the washer 24 being forced against the seating portion 23 of the male member 8 by a spiral spring member 26 nested against an internal shoulder 27 in the male member 8. A locking nut 29 is provided for engagement with the threaded collar 6 and threadably engages the threaded portion 7 of the male member 8. The cup-shaped member 3 has outwardly extending supporting members 30 with cutaway portions 31 for supporting an inverted cup-shaped member 32 disposed over the upper end of the member 14. The peripheral groove 9 of the male member 8 is adapted to engage with any suitable ball type female coupling member as shown in Figs. 2 and 3.

In operation, the female coupling member of a supply line is connected to the male member 8 and fuel will flow into the cup-shaped member 32 through the male member 8 and the member 14 thereby moving the check valves 18 and 25 against the force of the springs 16 and 21 and away from their respective seats 15 and 23. The fuel flows to the tank 1 until it is filled the desired amount. When the supply of fuel is shut off the check valves 25 and 18 seat on their respective seats 23 and 15 thereby preventing fluid from passing from the cup-shaped member 32 outwardly of the male member 8 and thereby sealing the tank 1. There will be no gasoline or other fuel around the upper portion of the inverted cup-shaped member 32 because of the air trapped therein thereby minimizing or eliminating the loss of any fuel from the coupling members upon disconnection thereof.

I have shown in Fig. 2 another illustration of my novel invention which comprises a fuel tank 51 in the wing 52 of an airplane. The wing 52 has an aperture 53 over which is disposed an inverted conical shaped member 54 having an aperture 55 in the upper end thereof for receiving a male member 56 of a coupling member. The male member 56 comprises connecting portion 57 having a peripheral groove 58 and inwardly projecting flanged portion 59 on the end thereof. An upwardly extending fuel pipe 61 has a threaded portion 62 for threadably engaging threaded portion 60 of the male member 56 of the coupling. The upper end 63 of the fuel line 61 is bent 180° as shown in Fig. 2 with the open end 64 thereon entering the fuel tank 1 in a vertical position. A cover member 65 is disposed over the open end 64 of the fuel pipe 61 and is urged to a closed position by spring member 66. A check valve 91 having an end washer 92 and a projecting end 93 is disposed in the male member 56 and is urged to sealing relationship with the flanged end 59 of the male member 56 by a spring 94.

A female member 70 for connection to the male member 56 comprises a shell 71 having radially extending apertures 72, a groove 30, and a threaded stop member 73 disposed on the end thereof. Ball members 74 are disposed in the radially extending apertures 72 and are locked by a locking member 75 movable on the outer side of the shell 71. An inner sleeve 76 moves longitudinally of the shell 71 and holds the ball members 74 outwardly as shown in Fig. 2 to hold the locking sleeve 75 in a position as shown in Fig. 2 when the female member 70 is in an unlocked position. A check valve 77 is disposed in the sleeve 76 and sealingly engages the flanged end 78 thereof. Spring members 79 and 80, respectively, urge the sleeve member 76 and the check valve 77 to sealing and locking relationship. The shell 71 as a laterally extending branch 81 with a valve 82 for draining off any liquid remaining in the fuel line 61 and the male member 56 when the valve 82 in the fuel supply line 83 is shut off. A valve 84 is provided in the drain line 81.

In operation, connection is made as shown in Fig. 3 between the female member 70 and the male member 56 by merely inserting the female member 70 over the male member 56 and the connection is made automatically in that when the sleeve 76 is moved longitudinally of the shell 71 the ball members 74 enter the peripheral groove 58 in the male member 56 and the locking sleeve 75 moves over the ball members 74 to hold them in a locking position in engagement with the groove 58 in the male member 56. Upon connection, the check valves 77 and 91 are moved longitudinally as shown in Fig. 3 to permit the flow of fluid from the main supply line 83 to the fuel line 61 and into the tank 1. When the fuel is passing through the fuel line 61 it forces the cover 65 against the force of the spring 66 to permit the flow of fuel into the tank 1. When the tank is filled to the height of the cover 65 or thereabove, the cover 65 closes and no more fuel enters the tank 1. Valve 82 in the supply line 83 is then closed and the valve 84 in the line 81 is opened and excess fuel passes downwardly from the fuel line 61 and outwardly through the drain line 81. The male and female members 56 and 70 are then disconnected without the loss of any fuel. It will be evident from the foregoing that I have provided novel means for fueling an airplane from the underside of the wing or the underpart of the fuselage holding a tank without losing any fuel in the process.

It will be evident that my novel device may be utilized for passing fluid to any form of tank from the underside thereof.

Various changes may be made in the specific embodiment of my invention without departing from the spirit thereof, or from the scope of the appended claims.

What I claim is:

1. A device for fueling a tank from the bottom thereof comprising an aperture in the bottom of the tank, an inverted cup shaped member disposed over the aperture in said tank and having outwardly projecting support members, an open inverted cup shaped hood disposed on said support members and spaced upwardly from said inverted cup shaped member and the bottom of said tank, a coupling member carried by said inverted cup shaped member having one end thereof extending to the upper portion of the inside of said hood and the connecting end extending externally of said inverted cup shaped member and said tank, and a spring urged check valve in said coupling member for sealing fluid in said tank when said coupling member is disconnected from a mated coupling member.

2. A device as set forth in claim 1 wherein said coupling member has an axially aligned check valve therein movable longitudinally to an open position when fluid flows through said coupling member to said tank.

3. A fueling device for fueling a tank having an aperture in the underside thereof comprising a first inverted cup shaped member supported in said tank and surrounding said aperture, a second inverted cup shaped member supported in said tank above and in spaced relation to said first cup shaped member, said second cup shaped member having a comparatively long skirt whereby air is trapped in the upper inner side thereof, a fuel line extending through said first cup shaped member and into the upper inner portion of said second inverted cup shaped member, a coupling member attached to said fuel line adapted to be coupled with a mated coupling member externally of said tank, and a check valve in said coupling member movable longitudinally thereof upon connection of said coupling member with a mated coupling member externally of said tank.

4. A fueling device as set forth in claim 3 wherein said fuel line has a spring urged check valve therein in alignment with the check valve in said coupling member movable by fluid pressure to an open position upon the unsealing of said check valve in said coupling member.

ALBERT T. SCHEIWER.

References Cited in the file of this patent

UNITED STATES PATENTS

| Number | Name | Date |
|---|---|---|
| 294,674 | Richter | Mar. 4, 1884 |
| 968,963 | Long | Aug. 30, 1910 |
| 1,527,429 | Ericson | Feb. 24, 1925 |
| 1,629,914 | Haas | May 24, 1927 |
| 1,787,916 | Polson | Jan. 6, 1931 |
| 2,108,714 | Hirsch | Feb. 5, 1938 |
| 2,234,393 | Amiot | Mar. 11, 1941 |
| 2,266,682 | Amiot | Dec. 16, 1941 |
| 2,329,337 | Criss | Sept. 14, 1943 |
| 2,362,559 | Jauch | Nov. 14, 1944 |
| 2,477,186 | Koehler | July 26, 1949 |